United States Patent
Chen et al.

(10) Patent No.: US 12,088,359 B2
(45) Date of Patent: Sep. 10, 2024

(54) RECEIVER OF COMMUNICATION SYSTEM AND EYE DIAGRAM MEASURING METHOD

(71) Applicant: Realtek Semiconductor Corporation, Hsinchu (TW)

(72) Inventors: Shih-Chang Chen, Hsinchu (TW); Chih-Wei Chang, Hsinchu (TW); Chun-Chi Yu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 128 days.

(21) Appl. No.: 17/938,050

(22) Filed: Oct. 5, 2022

(65) Prior Publication Data
US 2024/0007208 A1 Jan. 4, 2024

(30) Foreign Application Priority Data
Jun. 29, 2022 (TW) .................................. 111124389

(51) Int. Cl.
*H04B 17/345* (2015.01)
(52) U.S. Cl.
CPC .................................. *H04B 17/345* (2015.01)
(58) Field of Classification Search
CPC ..................................................... H04B 17/345

USPC ......................................................... 375/227
See application file for complete search history.

(56) References Cited

U.S. PATENT DOCUMENTS

| | | | |
|---|---|---|---|
| 2002/0060820 A1* | 5/2002 | Buchali | H04B 10/07953 398/202 |
| 2018/0262373 A1* | 9/2018 | Shibasaki | H04L 7/0334 |

* cited by examiner

*Primary Examiner* — Lihong Yu
(74) *Attorney, Agent, or Firm* — CKC & Partners Co., LLC

(57) ABSTRACT

An eye diagram measuring method includes: sampling a compensated input signal according to a reference voltage and a reference clock to obtain a first sampling result; and sampling a to-be-compensated input signal according to a scan voltage and a scan clock to obtain a second sampling result, including: (b1) storing a minimum phase and a voltage level which render the first sampling result identical to the second sampling result; (b2) increasing the voltage level and repeating operation (b1); (b3) decreasing the voltage level and repeating operation (b1); (b4) storing a maximum phase and the voltage level which render the first sampling result identical to the second sampling result; (b5) increasing the voltage level and repeating operation (b4); and (b6) decreasing the voltage level and repeating operation (b4). Voltage levels, maximum phases and minimum phases that are stored are for adjusting the reference voltage and the reference clock.

19 Claims, 7 Drawing Sheets

RECEIVER OF COMMUNICATION SYSTEM AND EYE DIAGRAM MEASURING METHOD

RELATED APPLICATIONS

This application claims priority to Taiwan Application Serial Number 111124389, filed on Jun. 29, 2022, which is herein incorporated by reference in its entirety.

BACKGROUND

Technical Field

The present disclosure relates to an eye diagram measuring technology. More particularly, the present disclosure relates to an eye diagram measuring method and a related receiver.

Description of Related Art

High-speed data transmission is the development focus of current wired communication technology, and faces the intersymbol interference (ISI) effect caused by the limited bandwidth. The common solution is to apply the equalizer in the receiver to compensate for the influence of the channel, and to apply the eye monitor in the receiver to measure the eye diagram of the output signal of the equalizer so as to evaluate the compensation result of the equalizer. For example, the eye monitor can match 128 voltage offsets to 128 phase offsets to obtain 128×128 sampling results, and can draw the eye diagram with voltage and phase respectively as vertical axis and horizontal axis based on the sampling results. However, such an eye diagram measuring method is time-consuming and requires significant storage space.

SUMMARY

The disclosure provides an eye diagram measuring method including the following operations: (a) sampling a compensated input signal according to a reference voltage and a reference clock to obtain a first sampling result; and (b) sampling a to-be-compensated input signal according to a scan voltage and a scan clock to obtain a second sampling result. Operation (b) includes: (b1) storing a minimum phase of the scan clock that renders the first sampling result identical to the second sampling result, and storing a voltage level of the scan voltage corresponding to the minimum phase; (b2) increasing the voltage level and repeating operation (b1); (b3) decreasing the voltage level and repeating operation (b1); (b4) storing a maximum phase of the scan clock that renders the first sampling result identical to the second sampling result, and storing the voltage level of the scan voltage corresponding to the maximum phase; (b5) increasing the voltage level and repeating operation (b4); and (b6) decreasing the voltage level and repeating operation (b4). A plurality of voltage levels, a plurality of maximum phases and a plurality of minimum phases that are stored are for adjusting the reference voltage and the reference clock.

The disclosure provides a receiver including a decision feedback equalizer (DFE) and an eye monitor. The DFE is configured to sample a compensated input signal according to a reference voltage and a reference clock to obtain a first sampling result, and configured to sample a to-be-compensated input signal according to a scan voltage and a scan clock to obtain a second sampling result. The eye monitor is configured to perform the following operations: (b1) storing a minimum phase of the scan clock that renders the first sampling result identical to the second sampling result, and storing a voltage level of the scan voltage corresponding to the minimum phase; (b2) increasing the voltage level and repeating operation (b1); (b3) decreasing the voltage level and repeating operation (b1); (b4) storing a maximum phase of the scan clock that renders the first sampling result identical to the second sampling result, and storing the voltage level of the scan voltage corresponding to the maximum phase; (b5) increasing the voltage level and repeating operation (b4); and (b6) decreasing the voltage level and repeating operation (b4). A plurality of voltage levels, a plurality of maximum phases and a plurality of minimum phases that are stored are for adjusting the reference voltage and the reference clock.

The aforesaid receiver and eye diagram measuring method have the advantages of high measuring speed and storage space saving.

It is to be understood that both the foregoing general description and the following detailed description are by examples, and are intended to provide further explanation of the disclosure as claimed.

DETAILED DESCRIPTION

Figure 1:
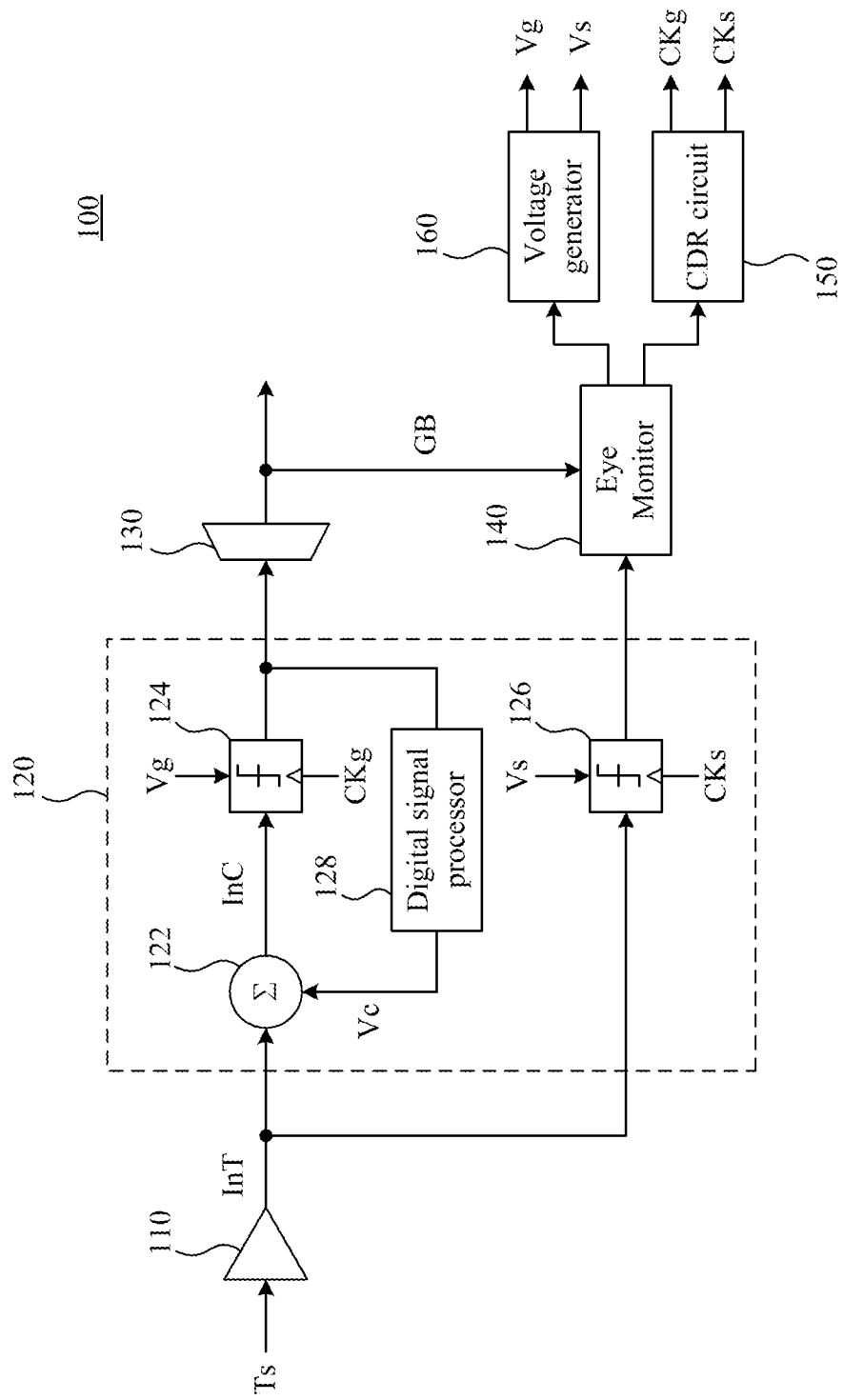
FIG. 1 is a simplified functional block diagram of a receiver according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a receiver 100 according to one embodiment of the present disclosure. The receiver 100 comprises a variable gain amplifier 110, a decision feedback equalizer (DFE) 120, a deserializer 130, an eye monitor 140, a clock data recovery (CDR) circuit 150 and a voltage generator 160. In some embodiments, the receiver 100 can be part of a wire communication system, and the variable gain amplifier 110 can receive a test signal Ts from a transmitter of the wire communication system through one or more channels. The variable gain amplifier 110 amplifies the test signal Ts to generate a to-be-compensated input signal InT. Amplifying the test signal Ts helps to correctly transmit the characteristic of the channel (e.g., the intersymbol interference (ISI) effect) to the DFE 120.

The DFE 120 is coupled with the variable gain amplifier 110, and receives the to-be-compensated input signal InT from the variable gain amplifier 110. The DFE 120 comprises an adder 122, a sampling circuit 124, a sampling circuit 126 and a digital signal processor 128. The adder 122 receives one or more compensation voltages Vc from the digital signal processor 128, and adds the to-be-compensated input signal InT and the one or more compensation voltages Vc to generate a compensated input signal InC. In some embodiments, the adder 122 is configured to compensate (i.e., to mitigate) the ISI effect.

The sampling circuit 124 is coupled with the adder 122, and samples the compensated input signal InC according to the reference voltage Vg and the reference clock CKg. The sampling circuit 126 is coupled with the variable gain amplifier 110, and samples the to-be-compensated input signal InT according to the scan voltage Vs and the scan clock CKs. In some embodiments, each of the sampling circuit 124 and the sampling circuit 126 may be implemented using a data slicer.

The digital signal processor 128 is coupled with the adder 122 and the sampling circuit 124, and generates the compensation voltage Vc according to an output of the sampling circuit 124. In some embodiments, the digital signal processor 128 may be implemented using M-th order finite impulse response (FIR) filter to generate M compensation voltages Vc according to M tap coefficients, in which M is a positive integer.

The CDR circuit 150 can generate the reference clock CKg and the scan clock CKs according to the test signal Ts. The voltage generator 160 generates the reference voltage Vg and the scan voltage Vs. The eye monitor 140 can control the CDR circuit 150, so as to control the phase offset of the reference clock CKg and the scan clock CKs. The eye monitor 140 can also control the voltage generator 160, so as to control the voltage offset of the reference voltage Vg and the scan voltage Vs.

The deserializer 130 is coupled with the sampling circuit 124, and converts the serial data outputted by the sampling circuit 124 to parallel data (hereinafter referred to as the "first sampling result GB"). The first sampling result GB is transmitted to the eye monitor 140 and other post-stage digital circuits (not shown). The eye monitor 140 can measure an eye diagram of the compensated input signal InC according to the first sampling result GB, in which the eye diagram may be used to evaluate the compensation result of the DFE 120. In some embodiments, the deserializer 130 may be implemented using the demultiplexer.

Figure 2:
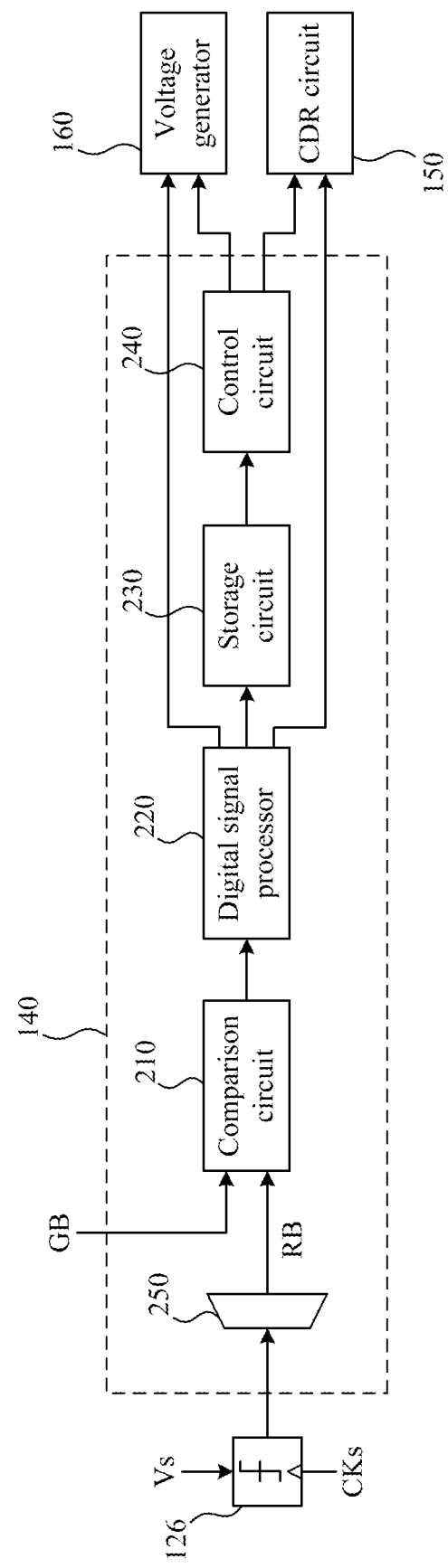
FIG. 2 is a simplified functional block diagram of an eye monitor according to one embodiment of the present disclosure.

Reference is made to FIG. 1 and FIG. 2, in which FIG. 2 is a simplified functional block diagram of an eye monitor 140 according to one embodiment of the present disclosure. The eye monitor 140 comprises a comparison circuit 210, a digital signal processor 220, a storage circuit 230 and a control circuit 240. The eye monitor 140 can convert the serial data outputted by the sampling circuit 126 to the parallel data so as to generate a second sampling result RB. In some embodiments, as shown in FIG. 2, the eye monitor 140 further comprises a deserializer 250 (e.g., the demultiplexer). The deserializer 250 converts the serial output of the sampling circuit 126 to the parallel second sampling result RB, but this disclosure is not limited thereto. The comparison circuit 210 compares the first sampling result GB and the second sampling result RB to generate a comparison output.

The digital signal processor 220 can control the CDR circuit 150 and the voltage generator 160 to adjust the phase of the scan clock CKs and the magnitude of the scan voltage Vs, thereby controlling the sampling circuit 126 to generate a plurality of second sampling results RB that are under different sampling conditions. The digital signal processor 220 further receives the comparison output of the comparison circuit 210. By processing the comparison output, the digital signal processor 220 can measure the eye diagram of the compensated input signal InC. The digital signal processor 220 stores the eye diagram in the storage circuit 230.

The control circuit 240 may automatically control the CDR circuit 150 and the voltage generator 160 according to the eye diagram in the storage circuit 230, in order to adjust the reference voltage Vg and the reference clock CKg. For example, the control circuit 240 may adjust the reference voltage Vg to a middle point of the eye height and/or adjust the reference clock CKg to a middle point of the eye width, in order to improve the bearing ability of the receiver 100 to the channel noises and the ISI effect. In some embodiments, the control circuit 240 may be implemented using the single-chip general processor, the multi-chip processor, the application specific integrated circuit (ASIC), the field programmable gate array (FPGA), other programmable logic devices or any combination thereof.

Figure 3:
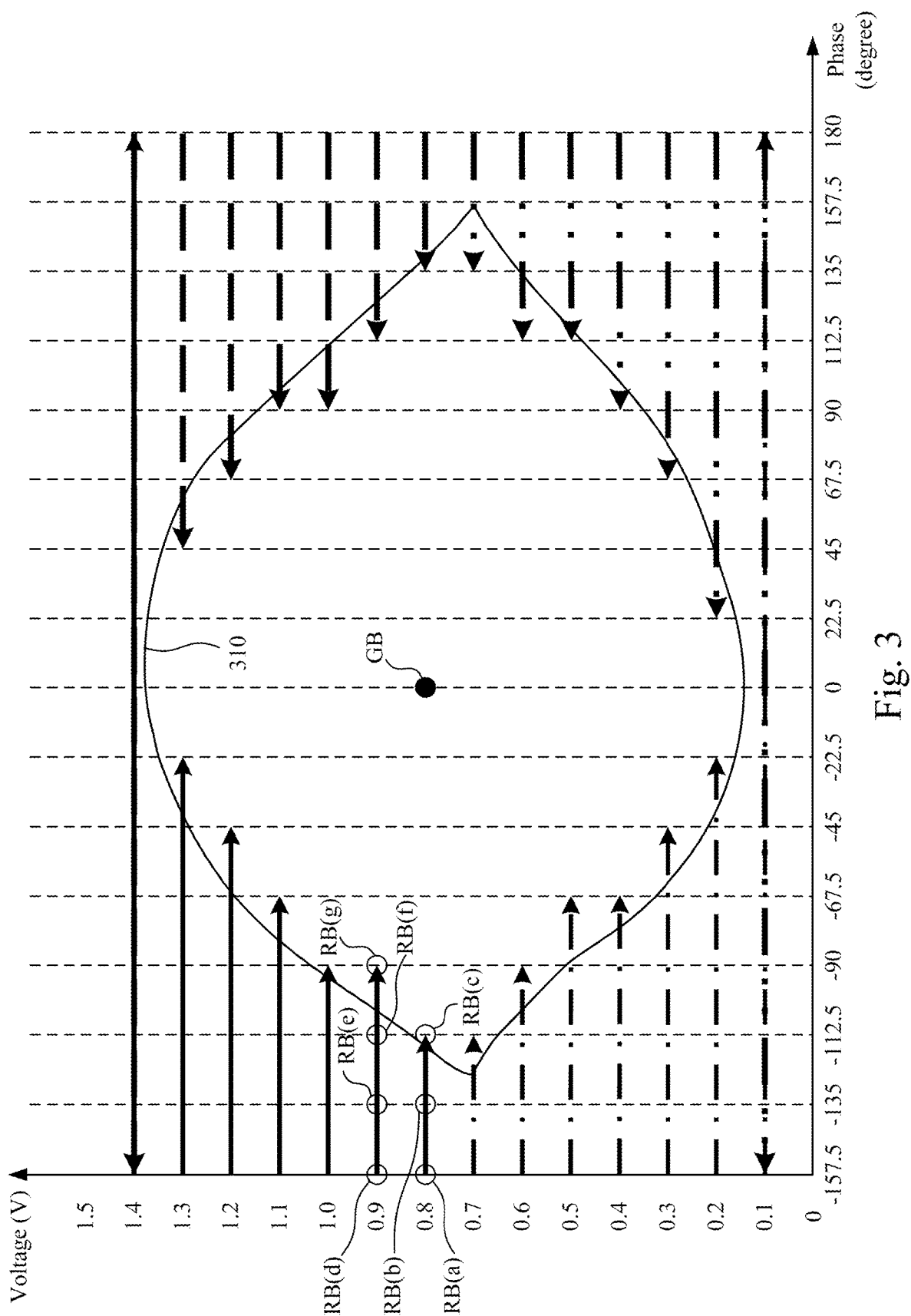
FIG. 3 is a schematic diagram of the eye diagram measuring process of the eye monitor.

The operation performed by the eye monitor 140 to measure the eye diagram of the compensated input signal InC is described in the following with reference to FIG. 1 through FIG. 3, in which FIG. 3 is a schematic diagram of the eye diagram measuring process of the eye monitor 140. In the following embodiments, the voltage generator 160 can set the voltage signals (e.g., the reference voltage Vg and/or the scan voltage Vs) to 16 grades of different voltage levels that are within a range of 0 to 1.5 V. The CDR circuit 150 can set the clock signals (e.g., the reference clock CKg and/or the scan clock CKs) to 16 grades of different phases within a range of −157.5° to 180°. The voltage level of the reference voltage Vg is set to 0.8 V, and the phase of the reference clock CKg is set to 0°. However, the configuration of the parameters in this disclosure is not limited to those discussed above, and can be designed according to practical requirements. For example, in some embodiments, the voltage generator 160 may set the voltage signals to 128 grades of different voltage levels. In other embodiments, the CDR circuit 150 may set the clock signals to 128 grades of different phases.

Reference is made to FIG. 3, in which the solid circle at the center of FIG. 3 represents the result that the sampling circuit 124 samples according to the reference voltage Vg and the reference clock CKg, that is, the first sampling result GB. The plurality of horizontal arrows are for illustrating the process of multiple times of sampling performed by the sampling circuit 126 according to the variable scan voltage Vs and scan clock CKs. Each of a plurality of cross points (e.g., the seven cross points marked by the hollow circles) at which the horizontal arrows and the vertical dashed lines intersect represents a sampling result of the sampling circuit 126, that is, the second sampling result RB. The eye-shaped diagram enclosed by the curves represents an eye 310 formed by the compensated input signal InC.

The following will first describe the measuring process of the upper-left border of the eye 310, in which the measuring process corresponds to the plurality of solid arrows of FIG. 3. Reference is made to FIG. 2, in some embodiments, the digital signal processor 220 set the initial voltage level of the scan voltage Vs to most approximate to a middle value of the voltage range (e.g., 0 to 1.5 V) of the voltage generator 160, such as 0.8 V, by controlling the voltage generator 160. In addition, by controlling the CDR circuit 150, the digital signal processor 220 set the initial phase of the scan clock CKs to a lower limit of the phase range (e.g., −157.5° to 180°) of the CDR circuit 150, such as −157.5°.

In other words, the digital signal processor 220 controls the sampling circuit 126 to sample the to-be-compensated input signal InT by the scan voltage Vs of 0.8 V and the scan clock CKs of −157.5°, thereby obtaining the second sampling result RB(a) of FIG. 3. Based on the comparison output of the comparison circuit 210, the digital signal processor 220 determines that the first sampling result GB is different from the second sampling result RB(a). In this situation, the digital signal processor 220 keeps the scan voltage Vs unchanged and increases the phase of the scan clock CKs by grade, in order to obtain other second sampling results RB(b) and RB(c). The second sampling result RB(c) is in the eye 310, and therefore is identical to the first sampling result GB.

When determining that the first sampling result GB is identical to the second sampling result RB(c), the digital signal processor 220 stops increasing the phase of the scan clock CKs, and stores the current configuration of parameters in the storage circuit 230, such as storing 0.8 V and −112.5° that correspond to the second sampling result RB(c). It is worth mentioning that the stored phase is a minimum phase that renders the first sampling result GB identical to the second sampling result RB, under the current voltage level. For example, in the situation that the scan voltage Vs is 0.8 V, although the scan clocks CKs of −112.5° and −90° both can render the first sampling result GB identical to the second sampling result RB, only −112.5° is stored in the storage circuit 230.

In other words, under the current voltage level, the digital signal processor 220 increases the phase of the scan clock CKs by grade from the lower phase limit (−157.5°), until the first sampling result GB is identical to the second sampling result RB. When the first sampling result GB is identical to the second sampling result RB, the digital signal processor 220 stores the voltage level and the phase under the current situation.

Then, the digital signal processor 220 may increase the scan voltage Vs by a grade to 0.9 V, and may repeat the operations similar to those discussed above. Under the scan voltage Vs of 0.9 V, the digital signal processor 220 increases the phase of the scan clock CKs by grade from the lower phase limit (−157.5°), in order to sequentially obtain a plurality of second sampling results RB(d), RB(e), RB(f) and RB(g), until the digital signal processor 220 determines that the first sampling result GB is identical to the second sampling result RB(g). The digital signal processor 220 stores 0.9 V and −90° that correspond to the second sampling result RB(g) in the storage circuit 230. The subsequent operations of the digital signal processor 220 may be applied by analogy, and the detailed descriptions thereof are omitted for the sake of brevity.

In some embodiments, the digital signal processor 220 increases the scan voltage Vs by grade. Until under a grade of voltage level the digital signal processor 220 determines that each grade of phase of the scan clock CKs cannot render the first sampling result GB identical to the second sampling result RB, the digital signal processor 220 stops increasing the voltage level of the scan voltage Vs. For example, as shown in FIG. 3, under the voltage of 1.4 V, the digital signal processor 220 have switched the scan clocks CKs from the lower phase limit (−157.5°) to the upper phase limit (180°), but the obtained second sampling results RB are all outside the eye 310 (i.e., different from the first sampling result GB). Therefore, the digital signal processor 220 would not further increase the voltage level of the scan voltage Vs to 1.5 V.

The following will describe the measuring process of the lower-left border of the eye 310, in which the measuring process corresponds to the plurality of one-dot chain arrows of FIG. 3. The digital signal processor 220 sets the initial voltage level of the scan voltage Vs to most approximate to the middle value of the voltage range (e.g., 0 to 1.5 V) of the voltage generator 160, such as 0.7 V. In addition, the digital signal processor 220 sets the initial phase of the scan clock CKs to the lower limit of the phase range (e.g., −157.5° to 180°) of the CDR circuit 150, such as −157.5°.

In other words, the digital signal processor 220 controls the sampling circuit 126 to sample the to-be-compensated input signal InT by the scan voltage Vs of 0.7 V and the scan clock CKs of −157.5°. Under the current voltage level, the digital signal processor 220 increases the phase of the scan clock CKs by grade from the lower phase limit (−157.5°), until the first sampling result GB is identical to the second sampling result RB. When the first sampling result GB is identical to the second sampling result RB, the digital signal processor 220 stores the configuration of the voltage level and the phase that are under the current situation. Then, the digital signal processor 220 may decrease the scan voltage Vs by a grade to 0.6 V, and may repeat the operations similar to those discussed above. The subsequent operations of the digital signal processor 220 may be applied by analogy, and the detailed descriptions thereof are omitted for the sake of brevity.

In some embodiments, the digital signal processor 220 decreases the voltage level of the scan voltage Vs by grade. Until under a grade of voltage level the digital signal processor 220 determines that each grade of phase of the scan clock CKs cannot render the first sampling result GB identical to the second sampling result RB, the digital signal processor 220 stops decreasing the voltage level of the scan voltage Vs. For example, under the voltage level of 0.1 V, the digital signal processor 220 have switched the scan clock CKs from the lower phase limit (−157.5°) to the upper phase limit (180°), but the obtained second sampling results RB are all outside the eye 310 (i.e., different from the first sampling result GB). Therefore, the digital signal processor 220 would not further decrease the voltage level of the scan voltage Vs to 0 V.

The following will describe the measuring process of the upper-right border of the eye 310, in which the measuring process corresponds to the plurality of dashed arrows of FIG. 3. The digital signal processor 220 sets the initial voltage level of the scan voltage Vs to most approximate to the middle point of the voltage range (e.g., 0 to 1.5 V) of the voltage generator 160, such as 0.8 V. In addition, the digital signal processor 220 sets the initial phase of the scan clock CKs to the upper limit of the phase range (e.g., −157.5° to 180°) of the CDR circuit 150, such as 180°.

In other words, the digital signal processor 220 controls the sampling circuit 126 to sample the to-be-compensated input signal InT by the scan voltage Vs of 0.8 V and the scan clock CKs of 180°. Under the current voltage level, the digital signal processor 220 decreases the phase of the scan clock CKs by grade from the upper phase limit (180°), until the first sampling result GB is identical to the second sampling result RB. When the first sampling result GB is identical to the second sampling result RB, the digital signal processor 220 stores the configuration of the voltage level and the phase that are under the current situation. Then, the digital signal processor 220 may increase the scan voltage Vs by a grade to 0.9 V, and may repeat the operations similar to those discussed above. The subsequent operations of the digital signal processor 220 may be applied by analogy, and the detailed descriptions thereof are omitted for the sake of brevity. It is worth mentioning that the stored phase is the maximum phase that renders the first sampling result GB identical to the second sampling result RB, under the current voltage level. For example, in the situation that the scan voltage Vs is 0.8 V, although the scan clocks CKs of 135° and 112.5° both can render the first sampling result GB identical to the second sampling result RB, only 135° is stored in the storage circuit 230.

Similar to the operations that are for measuring the upper-left border, in some embodiments, in the operations for measuring the upper-right border, when the digital signal processor 220 determines that each grade of phase of the scan clock CKs cannot render the first sampling result GB identical to the second sampling result RB, the digital signal processor 220 stops increasing the voltage level of the scan voltage Vs.

The following will describe the measuring process of the lower-right border of the eye 310, in which the measuring process corresponds to the plurality of two-dot chain arrows of FIG. 3. The digital signal processor 220 sets the initial voltage level of the scan voltage Vs to most approximate to the middle value of the voltage range (e.g., 0 to 1.5 V) of the voltage generator 160, such as 0.7 V. In addition, the digital signal processor 220 sets the initial phase of the scan clock CKs to the upper limit of the phase range (e.g., −157.5° to 180°) of the CDR circuit 150, such as 180°.

In other words, the digital signal processor 220 controls the sampling circuit 126 to sample the to-be-compensated input signal InT by the scan voltage Vs of 0.7 V and the scan clock CKs of 180°. Under the current voltage level, the digital signal processor 220 decreases the phase of the scan clock CKs by grade from the upper phase limit (180°), until the first sampling result GB is identical to the second sampling result RB. When the first sampling result GB is identical to the second sampling result RB, the digital signal processor 220 stores the configuration of the voltage level and the phase that are under the current situation. Then, the digital signal processor 220 may decrease the scan voltage Vs by a grade to 0.6 V, and may repeat the operations similar to those discussed above. The subsequent operations of the digital signal processor 220 may be applied by analogy, and the detailed descriptions thereof are omitted.

Similar to the operations for measuring the lower-left border, in some embodiments, in the operations for measuring the lower-right border, when the digital signal processor 220 determines that each grade of phase of the scan clock CKs cannot render the first sampling result GB identical to the second sampling result RB, the digital signal processor 220 stops decreasing the voltage level of the scan voltage Vs.

Figure 4:
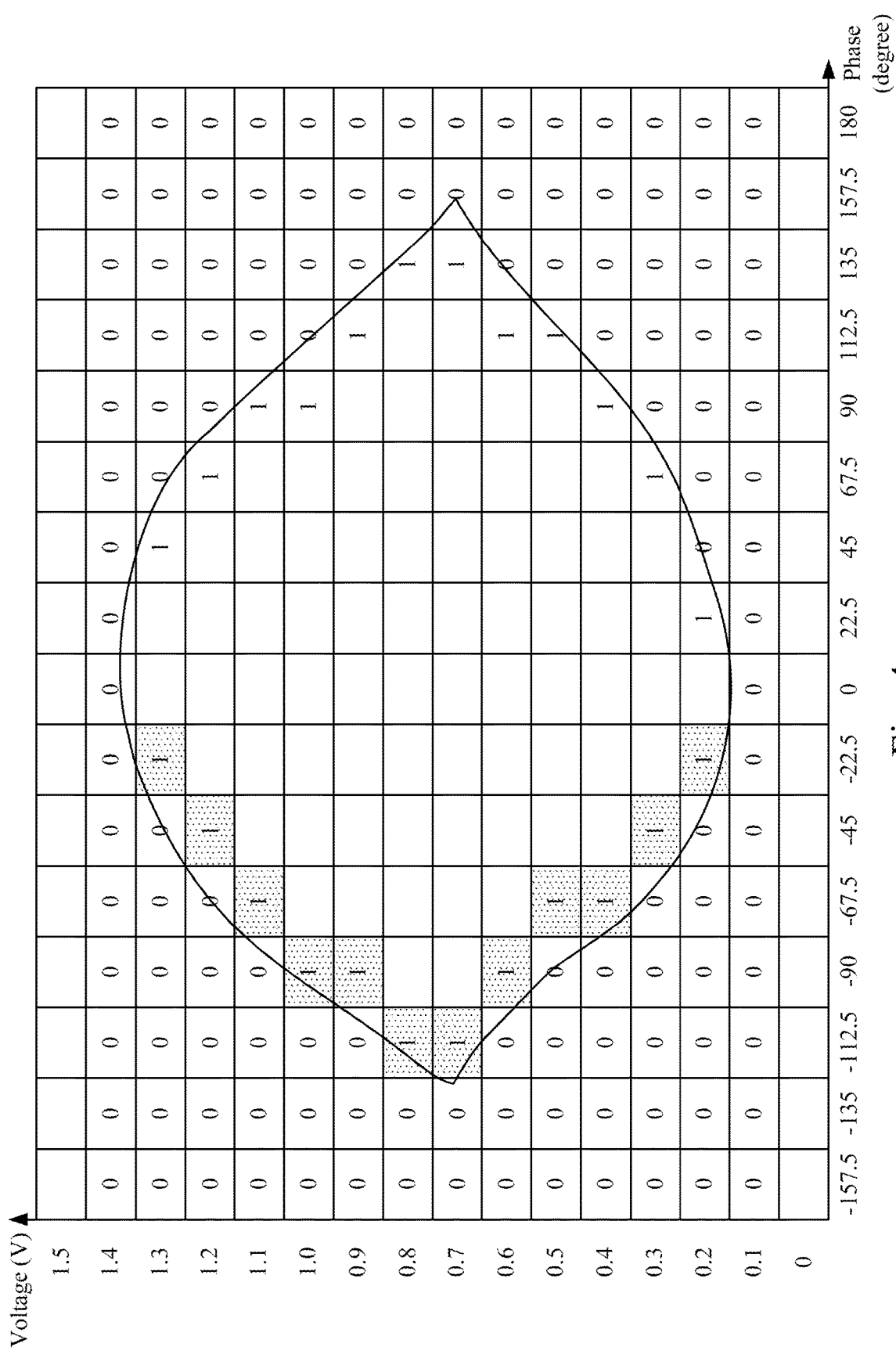
FIG. 4 is a schematic diagram for illustrating an eye diagram of one embodiment of the present disclosure.

FIG. 4 is a schematic diagram for illustrating an eye diagram of one embodiment of the present disclosure. In FIG. 4, each square grid corresponds to a combination of the voltage level of the scan voltage Vs and the phase of the scan clock CKs. Each of the plurality of "0" and "1" corresponds to a sample of the sampling circuit 126. "0" represents that the first sampling result GB and the second sampling result RB are different, and the storage circuit 230 needs not to store the parameter configuration corresponding to the "0". "1" represents that the first sampling result GB and the second sampling result RB are identical, and the parameter configuration corresponding to the "1" is stored in the storage circuit 230. The eye-shaped diagram in FIG. 4 is for the convenience of comparison with FIG. 3, and does not actually exist in the eye diagram measured by the eye monitor 140.

As can be known from FIG. 4, the storage circuit 230 of FIG. 2 stores: (1) the plurality of minimum phases that render the first sampling result GB identical to the second sampling result RB and the plurality of voltage levels (corresponding to the plurality of "1" with shade) corresponding to these minimum phases; and (2) the plurality of maximum phases that render the first sampling result GB identical to the second sampling result RB and the plurality of voltage levels (corresponding to the plurality of "1" without shade) corresponding to these maximum phases. In this disclosure, the "eye diagram" measured by the eye monitor 140 may represent the diagram formed by the plurality of "1" of FIG. 4. The control circuit 240 of FIG. 2 can calculate the eye height and the eye width of the eye diagram according to the data in the storage circuit 230, and may automatically adjust the reference voltage Vg and the reference clock CKg according to the eye height and the eye width.

The conventional eye diagram measuring method uses every combination of the scan voltage Vs and the scan clock CKs to measure. Therefore, under the configuration of 16-grade scan voltage Vs and 16-grade scan clock CKs, the conventional eye diagram measuring method requires a total of 256 measurements (i.e., 16×16 times). In contrast, there are only 151 "0" and "1" in FIG. 4, that is, the eye monitor 140 requires only 151 measurements under the same condition. The total number of the empty square grids is the measurement times that the eye monitor 140 saved in comparison to the conventional eye diagram measuring method. In addition, the conventional eye diagram measuring method stores every measurement result, that is, storing 256 combinations of the scan voltage Vs and the scan clock CKs. In contrast, FIG. 4 has only 24 "1", that is, the eye monitor 140 only needs to store 24 combinations of the scan voltage Vs and the scan clock CKs. Accordingly, the eye monitor 140 has the advantages of high measurement speed and storage space saving.

Figure 5:
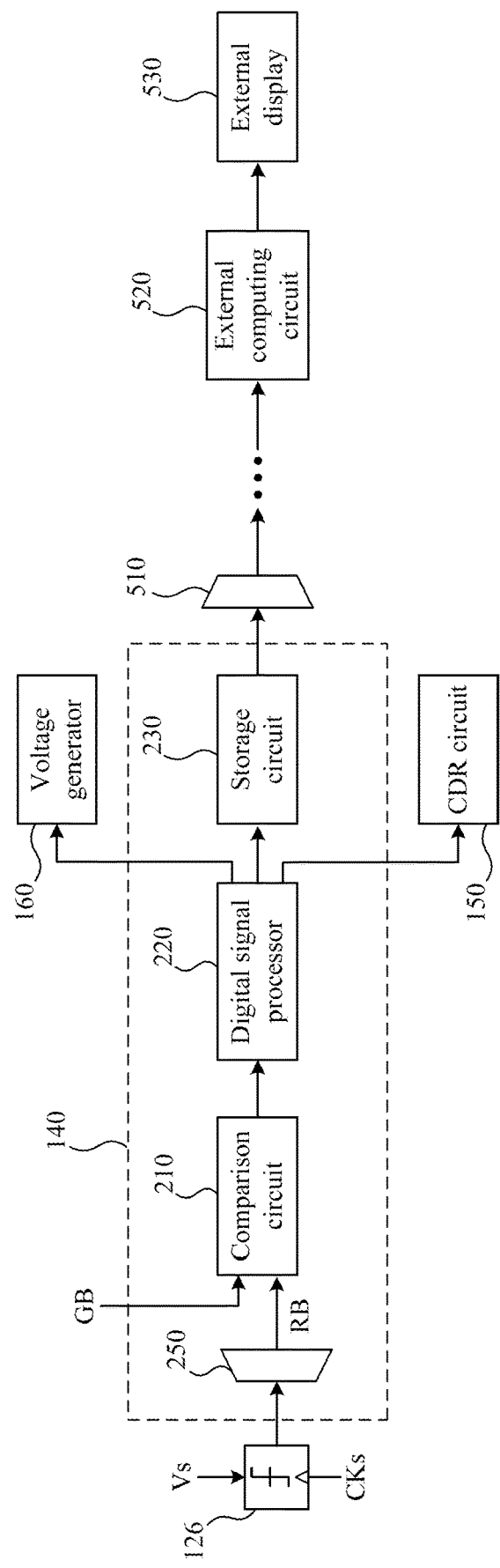
FIG. 5 is a simplified functional block diagram of an eye monitor according to one embodiment of the present disclosure.

FIG. 5 is a simplified functional block diagram of an eye monitor 140 according to one embodiment of the present disclosure. The eye monitor 140 of FIG. 5 does not comprise the control circuit 240, and the storage circuit 230 thereof is coupled with a serializer 510 (e.g., the multiplexer). The eye monitor 140 outputs the data in the storage circuit 230 (i.e., the voltage levels, the maximum phases and the minimum phases) to an external computing circuit 520 through the serializer 510, in which the serializer 510 converts the parallel data to the serial data. The external computing circuit 520 controls, according to the received data (i.e., the voltage levels, the maximum phases and the minimum phases), an external display 530 to display the eye diagram as the basis of adjustment for the user to the reference voltage Vg and the reference clock CKg. In some embodiments, the external computing circuit 520 may be implemented by using the personal computer, the laptop, other electronic device with the ability of logic operation or any combination thereof. Other components, connection relationships, operations and advantages of the eye monitor 140 of FIG. 5 are similar to those discussed above in the embodiment of FIG. 2, and the detailed descriptions thereof are omitted for the sake of brevity.

Figure 6:
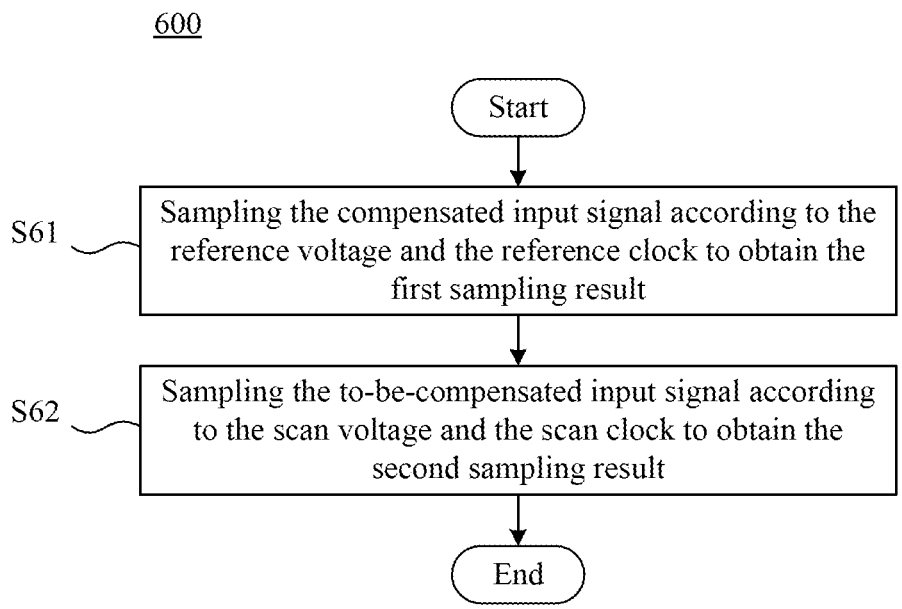
FIG. 6 is a flowchart of an eye diagram measuring method according to one embodiment of the present disclosure.

FIG. 6 is a flowchart of an eye diagram measuring method 600 according to one embodiment of the present disclosure. The eye diagram measuring method 600 may be executed by the receiver 100 of FIG. 1. The eye diagram measuring method 600 comprises operations S61 and S62. In operation S61, the DFE 120 samples the compensated input signal InC according to the reference voltage Vg and the reference clock CKg to obtain the first sampling result GB. In operation S62, the DFE 120 samples the to-be-compensated input signal InT according to the scan voltage Vs and the scan clock CKs to obtain the second sampling result RB.

Figure 7:
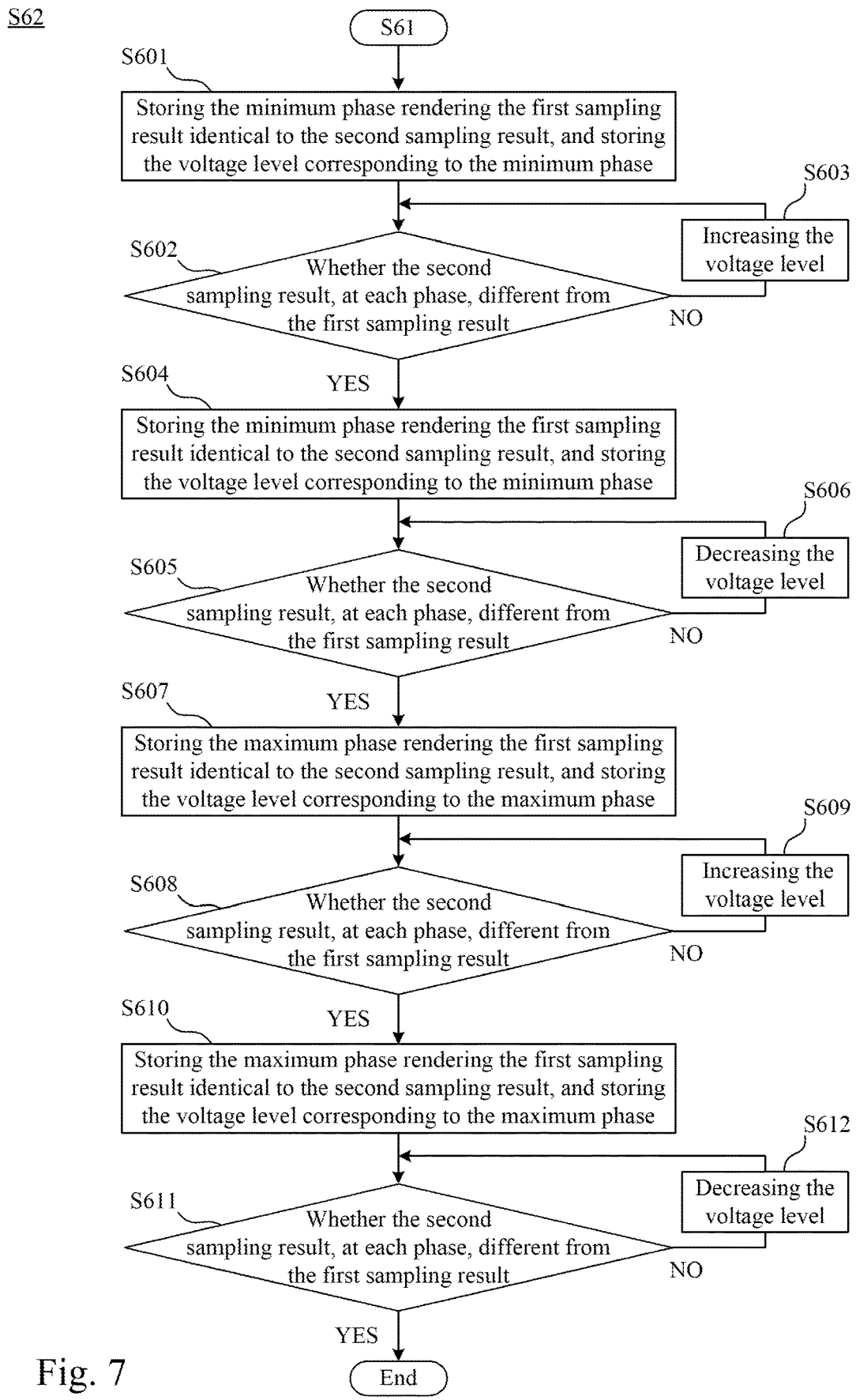
FIG. 7 is a flowchart for further illustrating a operation of the eye diagram measuring method.

FIG. 7 is a flowchart for further illustrating operation S62 of the eye diagram measuring method 600, in which operation S62 comprises operations S601-S612. In operation S601, the eye monitor 140 stores the minimum phase of the scan clock CKs that render the first sampling result GB identical to the second sampling result RB, and stores the voltage level of the scan voltage Vs corresponding to the minimum phase. The eye monitor 140 increases the phase of the scan clock CKs by grade from the lower phase limit, until the first sampling result GB is identical to the second sampling result RB. Then, when the first sampling result GB is identical to the second sampling result RB, the eye monitor 140 stores the phase of the scan clock CKs as the minimum phase.

In operation S602, the eye monitor 140 determines whether the second sampling result RB is, at each grade of phase of the scan clock CKs, different from the first sampling result GB. If not, the eye monitor 140 conducts operation S603 to increase the voltage level of the scan voltage Vs by one grade, in which the eye monitor 140 repeats operation S601 after operation S603 is finished. If the determination of operation S602 is "YES" (i.e., at each grade of phase of the scan clock CKs, the second sampling result RB is different from the first sampling result GB), the eye monitor 140 proceeds to operation S604.

Operations S604 and S605 are similar to operations S601 and S602, respectively, and the detailed descriptions thereof are omitted for the sake of brevity. If the determination of operation S605 is "NO," the eye monitor 140 proceeds to operation S606 to decrease the voltage level of the scan voltage Vs by one grade, in which the eye monitor 140 repeats operation S604 after operation S606 is finished. If the determination of S605 is "YES," the eye monitor 140 proceeds to operation S607.

In operation S607, the eye monitor 140 stores the maximum phase of the scan clock CKs that renders the first sampling result GB identical to the second sampling result RB, and stores the voltage level of the scan voltage Vs corresponding to the maximum phase. The eye monitor 140 may decrease the phase of the scan clock CKs by grade from the upper phase limit, until the first sampling result GB is identical to the second sampling result RB. Then, when the first sampling result GB is identical to the second sampling result RB, the eye monitor 140 stores the phase of the scan clock CKs as the maximum phase.

In operation S608, the eye monitor 140 determines whether the second sampling result RB is, at each grade of the phase of the scan clock CKs, different from the first sampling result GB. If not, the eye monitor 140 proceeds to operation S609 to increase the voltage level of the scan voltage Vs by one grade, in which the eye monitor 140 repeats operation S607 after operation S609 is finished. If the determination of operation S608 is "YES" (i.e., the second sampling result RB is different from the first sampling result GB at each grade of the phase of the scan clock CKs), the eye monitor 140 proceeds to operation S610.

Operations S610 and S611 are similar to operations S607 and S608, respectively, and the detailed descriptions thereof are omitted for the sake of brevity. If the determination of operation S611 is "NO," the eye monitor 140 proceeds to operation S612 to decrease the voltage level of the scan voltage Vs by a grade, in which the eye monitor 140 repeats operation S610 after operation S612 is finished. If the determination of operation S611 is "YES," the eye monitor 140 may finish the eye diagram measuring method 600.

It will be understood that the eye diagram measuring method 600 may include greater or fewer operations than illustrated in the flowchart and the operations may be performed in any order, as appropriate. In some embodiments, the execution order of the four groups of operations, operations S601-S603, operations S604-S606, operations S607-S609 and operations S610-S612, may be swapped with each other. In some embodiments, any two groups of the four groups of operations may be executed in parallel. In some embodiments, the four groups of operations may be executed in parallel.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An eye diagram measuring method, comprising:
   (a) sampling a compensated input signal according to a reference voltage and a reference clock to obtain a first sampling result; and
   (b) sampling a to-be-compensated input signal according to a scan voltage and a scan clock to obtain a second sampling result, comprising:
   (b1) storing a minimum phase of the scan clock that renders the first sampling result identical to the second sampling result, and storing a voltage level of the scan voltage corresponding to the minimum phase;
   (b2) increasing the voltage level and repeating operation (b1);
   (b3) decreasing the voltage level and repeating operation (b1);

(b4) storing a maximum phase of the scan clock that renders the first sampling result identical to the second sampling result, and storing the voltage level of the scan voltage corresponding to the maximum phase;

(b5) increasing the voltage level and repeating operation (b4); and (b6) decreasing the voltage level and repeating operation (b4), wherein a plurality of voltage levels, a plurality of maximum phases and a plurality of minimum phases that are stored are for adjusting the reference voltage and the reference clock.

2. The eye diagram measuring method of claim 1, wherein operation (b1) comprises:

increasing a phase of the scan clock by grade from a lower phase limit, until the first sampling result is identical to the second sampling result; and when the first sampling result is identical to the second sampling result, storing the phase of the scan clock as the minimum phase.

3. The eye diagram measuring method of claim 2, wherein operation (b2) comprises:

when the second sampling result is different from the first sampling result at each grade of the phase of the scan clock, stopping increasing the voltage level and stopping repeating operation (b1).

4. The eye diagram measuring method of claim 2, wherein operation (b3) comprises:

when the second sampling result is different from the first sampling result at each grade of the phase of the scan clock, stopping decreasing the voltage level and stopping repeating operation (b1).

5. The eye diagram measuring method of claim 1, wherein operation (b4) comprises:

decreasing a phase of the scan clock by grade from an upper phase limit, until the first sampling result is identical to the second sampling result; and when the first sampling result is identical to the second sampling result, storing the phase of the scan clock as the maximum phase.

6. The eye diagram measuring method of claim 5, wherein operation (b5) comprises:

when the second sampling result is different from the first sampling result at each grade of the phase of the scan clock, stopping increasing the voltage level and stopping repeating operation (b4).

7. The eye diagram measuring method of claim 5, wherein operation (b6) comprises:

when the second sampling result is different from the first sampling result at each grade of the phase of the scan clock, stopping decreasing the voltage level and stopping repeating operation (b4).

8. The eye diagram measuring method of claim 1, further comprising:

automatically adjusting the reference voltage and the reference clock, according to the plurality of voltage levels, the plurality of maximum phases and the plurality of minimum phases that are stored.

9. The eye diagram measuring method of claim 1, further comprising:

outputting the plurality of voltage levels, the plurality of maximum phases and the plurality of minimum phases that are stored to an external computing circuit, so that the external computing circuit controls an external display to display an eye diagram according to the plurality of voltage levels, the plurality of maximum phases and the plurality of minimum phases.

10. A receiver, comprising:

a decision feedback equalizer (DFE), configured to sample a compensated input signal according to a reference voltage and a reference clock to obtain a first sampling result, and configured to sample a to-be-compensated input signal according to a scan voltage and a scan clock to obtain a second sampling result; and an eye monitor, configured to perform the following operations:

(b1) storing a minimum phase of the scan clock that renders the first sampling result identical to the second sampling result, and storing a voltage level of the scan voltage corresponding to the minimum phase;

(b2) increasing the voltage level and repeating operation (b1);

(b3) decreasing the voltage level and repeating operation (b1);

(b4) storing a maximum phase of the scan clock that renders the first sampling result identical to the second sampling result, and storing the voltage level of the scan voltage corresponding to the maximum phase;

(b5) increasing the voltage level and repeating operation (b4); and (b6) decreasing the voltage level and repeating operation (b4), wherein a plurality of voltage levels, a plurality of maximum phases and a plurality of minimum phases that are stored are for adjusting the reference voltage and the reference clock.

11. The receiver of claim 10, wherein the eye monitor comprises:

a comparison circuit, configured to compare the first sampling result and the second sampling result to generate a comparison output; and a digital signal processor, configured to receive the comparison output, configured to control the scan voltage and the scan clock, and configured to perform the following operations to store the minimum phase of the scan clock and the voltage level of the scan voltage corresponding to the minimum phase:

increasing a phase of the scan clock by grade from a lower phase limit, until the first sampling result is identical to the second sampling result; and when the first sampling result is identical to the second sampling result, storing the phase of the scan clock as the minimum phase.

12. The receiver of claim 11, wherein operation (b2) comprises:

when the second sampling result is different from the first sampling result at each grade of the phase of the scan clock, the digital signal processor stops increasing the voltage level, and stops storing the minimum phase of the scan clock and the voltage level of the scan voltage corresponding to the minimum phase.

13. The receiver of claim 11, wherein operation (b3) comprises:

when the second sampling result is different from the first sampling result at each grade of the phase of the scan clock, the digital signal processor stops decreasing the voltage level, and stops storing the minimum phase of the scan clock and the voltage level of the scan voltage corresponding to the minimum phase.

14. The receiver of claim 10, wherein the eye monitor comprises:
- a comparison circuit, configured compare the first sampling result and the second sampling result to generate a comparison output; and
- a digital signal processor, configured to receive the comparison output, configured to control the scan voltage and the scan clock, and configured to perform the following operations to store the maximum phase of the scan clock and the voltage level of the scan voltage corresponding to the maximum phase:
  - decreasing a phase of the scan clock by grade from an upper phase limit, until the first sampling result is identical to the second sampling result; and
  - when the first sampling result is identical to the second sampling result, storing the phase of the scan clock as the maximum phase.

15. The receiver of claim 14, wherein operation (b5) comprises:
- when the second sampling result is different from the first sampling result at each grade of the phase of the scan clock, the digital signal processor stops increasing the voltage level, and stops storing the maximum phase of the scan clock and the voltage level of the scan voltage corresponding to the maximum phase.

16. The receiver of claim 14, wherein operation (b6) comprises:
- when the second sampling result is different from the first sampling result at each grade of the phase of the scan clock, the digital signal processor stops decreasing the voltage level, and stops storing the maximum phase of the scan clock and the voltage level of the scan voltage corresponding to the maximum phase.

17. The receiver of claim 10, wherein the eye monitor comprises:
- a storage circuit, configured to store the plurality of voltage levels, the plurality of maximum phases and the plurality of minimum phases; and
- a control circuit, configured to automatically adjust the reference voltage and the reference clock, according to the plurality of voltage levels, the plurality of maximum phases and the plurality of minimum phases.

18. The receiver of claim 10, wherein the eye monitor comprises:
- a storage circuit, configured to store the plurality of voltage levels, the plurality of maximum phases and the plurality of minimum phases,
- wherein the eye monitor is configured to output the plurality of voltage levels, the plurality of maximum phases and the plurality of minimum phases to an external computing circuit, so that the external computing circuit controls an external display to display an eye diagram according to the plurality of voltage levels, the plurality of maximum phases and the plurality of minimum phases.

19. The receiver of claim 10, wherein the DFE comprises:
- an adder, configured to add one or more compensation voltages and the to-be-compensated input signal to generate the compensated input signal;
- a first sampling circuit, configured to sample the compensated input signal according to the reference voltage and the reference clock, wherein the first sampling result is generated according to an output of the first sampling circuit; and
- a second sampling circuit, configured to sample the to-be-compensated input signal according to the scan voltage and the scan clock, wherein the second sampling result is generated according to an output of the second sampling circuit.

* * * * *